Figure 1:
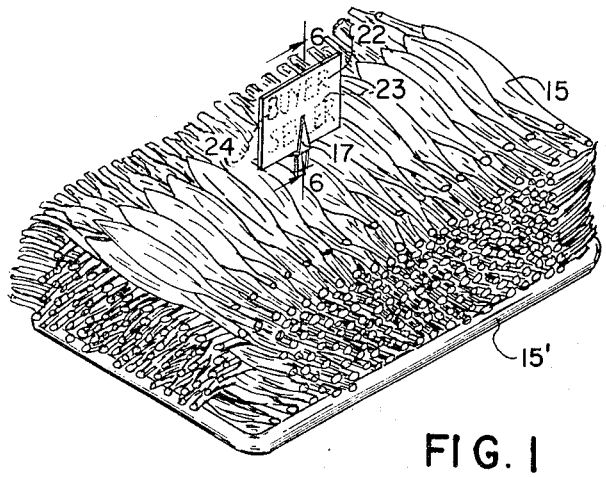

June 20, 1967  W. J. MAUCHLINE  3,325,929

TOBACCO SALES TICKET HOLDER

Filed Sept. 22, 1964

INVENTOR
W. J. MAUCHLINE

BY

ATTORNEYS

United States Patent Office 3,325,929
Patented June 20, 1967

3,325,929
TOBACCO SALES TICKET HOLDER
William J. Mauchline, Rocky Mount, N.C., assignor to Associated Products, Inc., Rocky Mount, N.C.
Filed Sept. 22, 1964, Ser. No. 398,183
3 Claims. (Cl. 40—11)

This invention relates to the identification of various commodities including the designating of persons and objects involved in a project or transaction, for example but not limited to, the sale of leaf tobacco on an auction floor for indicating the buyer and others involved, and to devices employed for identification, whether it be leaf tobacco in a warehouse, freshly planted seed, plants or flowers in a garden, or other things.

This invention relates particularly to a tobacco peg stick or identification device by which an identifying label carrying desired data can be readily utilized for identification purposes, such as by being attached to a batch or unit of tobacco leaves sold on the auction floor among various other generally similar piles or units of tobacco leaves whether bundled or not, for the identification and recognition thereof, although as indicated the device has numerous other uses.

It has been the custom to place cured leaves of tobacco tied together in clusters or hands in relatively flat baskets and to arrange these baskets or containers in rows on the floor of a warehouse to be sold to the highest bidder by an auctioneer. In order to provide the necessary identification it has been customary to attach cards or the like containing information relative to the seller, the buyer, and the like. These pegs have required substantial labor to produce, were unattractive, and of limited use and durability, were not easy to identify, and sometimes were toxic and germ-laden and consequently contributed to the problem of sanitation as well as labeling. It also has been customary to place an envelope, from which seeds have been planted, on a stick stuck in the ground to identify the location and variety of flower or plant before such seeds germinated and grew, and to apply a support carrying an identifying label in various other places and on various other products.

It is an object of the invention to provide a relatively simple inexpensive identification device such as a tobacco peg stick which is more attractive, can be made in large quantities, of plastic or moldable substance, of bright colors easily identifiable from a distance, and which device is reusable, non-toxic, stronger, and more durable.

Another object of the invention is to provide an identification device such as a tobacco peg stick which will not splinter or disintegrate and the particles thereof become distributed in the tobacco and cause damage to the tobacco and to the equipment employed in the processing of the same.

Figure 2:
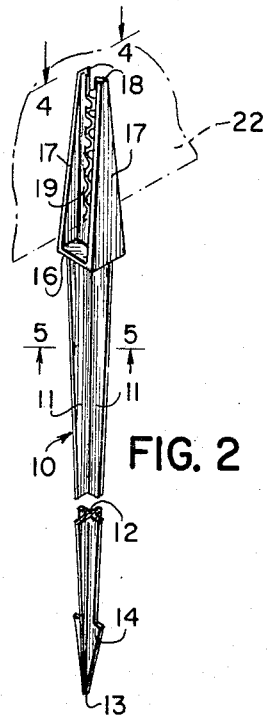
Figure 3:
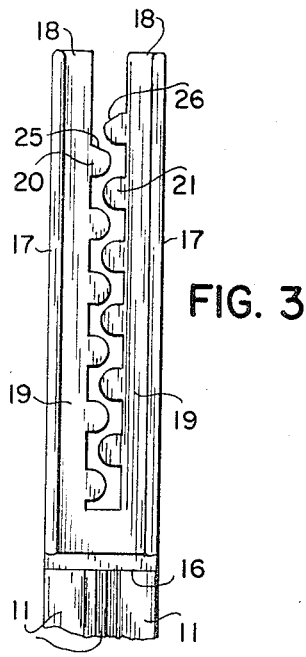
Figure 4:
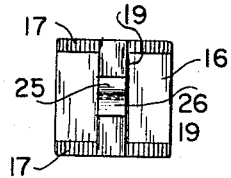
Figure 5:
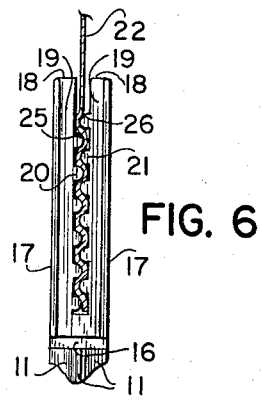
Figure 6:
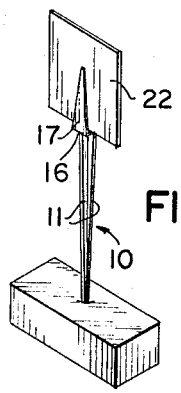
Figure 7:
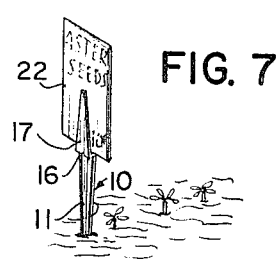

Other objects and advantages of the invention will be apparent from the following description taken in conjunction with the accompanying drawing in which:

FIG. 1 is a perspective illustrating one use of the invention;

FIG. 2, a perspective of the invention itself;

FIG. 3, a side elevation of the opposed clamping jaw construction;

FIG. 4, a view on the line 4—4 of FIG. 2;

FIG. 5, a view on the line 5—5 of FIG. 2;

FIG. 6, a fragmentary side elevation illustrating the manner of gripping of a card or sheet;

FIG. 7, a perspective illustrating another use of the invention; and

Figure 8:
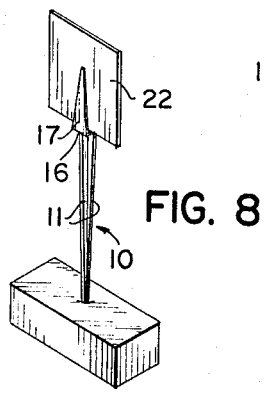

FIG. 8, a perspective illustrating the device in a separate base.

Briefly stated the present invention is an identification device, souvenir, or the like having a slim shaft or body with a piercing point at one end and opposed jaws at the opposite end between which are adapted to be received and grippingly held a sheet or card carrying certain information, as, for example, when used to identify tobacco on a warehouse floor to carry information as to the seller, buyer, etc. The peg stick or identification device includes a shaft having a cross-section in the form of a Greek or Saint Andrews cross, such shaft having its smaller end tapered to a sharp piercing point and with two of the opposed flanges provided with retention enlargements, the opposite end of the shaft being bifurcated and having opposed convolutions adapted to engage the opposite sides of the information containing sheet or card.

The tobacco or other peg stick of the present invention comprises a body or shaft 10 of simple character as for example having right angle longitudinal flanges 11 radiating from its axis 12. The flanges 11 taper gradually to a piercing point 13 of reduced size with at least one of two pairs of opposed flanges provided with retaining or shouldered enlargements 14 so that when the piercing point is thrust through a tobacco leaf 15 it will be retained in place by such shouldered enlargement. Thus the shaft may be thrown or propelled into a position of use such as upon a pile or unit of leaves of tobacco contained in a conventional basket 15' and readily retained until it is desired to remove the same.

The shaft 10 is provided on its larger end with a transverse portion 16 of square or other desired shape and having spaced integral yoke forming arms 17. The sides of the arms 17 taper from the square base 16 thereof of relatively small extremities 18. Each of the arms 17 is provided with a central rib 19 having spaced projections 20 and 21 disposed in alternate relation but with the crowns of such projections in overlapping relation so that a card or sheet 22 may be inserted and retained therebetween, such card 22 being adapted to have data 23 as to the seller, and data 24 as to the buyer, or other desired identification character or characters, so that at least when used as a tobacco peg stick the seller and the purchaser of the tobacco can be readily identified.

In order to facilitate the insertion of the card or sheet 22 inclined or cam surfaces 25 and 26 on the endmost projections may be provided so that when a card or sheet 22 is inserted its edge will engage cam surfaces 26 and 25 in sequence and will be threaded or directed centrally between the overlapping projections 20 and 21 where it will be held until removed.

It will be apparent from the foregoing that the invention contemplates the production of an identification device, whether used as a tobacco peg stick or for other purposes, which is of attractive, non-toxic, readily usable and reusable material and which can be readily produced in large quantities in various bright and distinctive colors capable of ready identification from a distance and which is of minimum expense, of the desired shape, and can be used as a color code system for the identification of warehousemen, and which will not splinter and allow particles to cause injury to the tobacco or to other products or equipment and machinery used in the processing of the tobacco. The invention also contemplates the use of the device produced by injection molding at low cost and yet reusable indoors and outdoors, and mounted in a base 27 of suitable character such as styrofoam, to identfy or display information with regard to a product or the like.

It will be obvious to one skilled in the art that various changes may be made in the invention without departing from the spirit and scope thereof and therefore the invention is not limited by that which is illustrated in the drawing and described in the specification, but only as indicated in the accompanying claims.

What is claimed is:

1. An identification device of a character to be used as as a tobacco peg stick comprising a relatively long slim shaft having a central axis and portions extending outwardly therefrom, said shaft being tapered susbtantially its entire length and terminating in a piercing point at one end, an integral transverse portion at the opposite end of said shaft, a pair of arms mounted on said transverse portion and extending outwardly therefrom, each of said arms having a surface generally parallel with the surface of the other arm, a plurality of projections disposed on each of said surfaces and extending toward the surface of the other arm, the projections of one arm being in staggered vertically offset relation to the projections of the other arm, each of said projections terminating in a generally inclined portion to facilitate the insertion of a card therebetween, and said inclined portions being located substantially midway between said surfaces, whereby a card can be inserted between and gripped by said projections and the piercing point of said shaft can be inserted in the material to be identified.

2. The structure of claim 1 in which the inclined portions of the projections of one surface extend beyond the inclined portions of the projections of the other surface in overlapping relation with each other, and such portions are generally rounded.

3. The structure of claim 1 including opposed flanges adjacent to said piercing point providing shoulders for retaining said shaft in said material.

References Cited

UNITED STATES PATENTS

| | | | |
|---|---|---|---|
| 774,036 | 11/1904 | Burgess | 40—11 X |
| 794,561 | 7/1905 | Spencer | 40—23 X |
| 2,154,966 | 4/1939 | Vanderveer | 40—11 X |
| 2,625,760 | 1/1953 | Cleal | 40—19 |

ENGENE R. CAPOZIO, *Primary Examiner.*

W. J. CONTRERAS, *Assistant Examiner.*